UNITED STATES PATENT OFFICE.

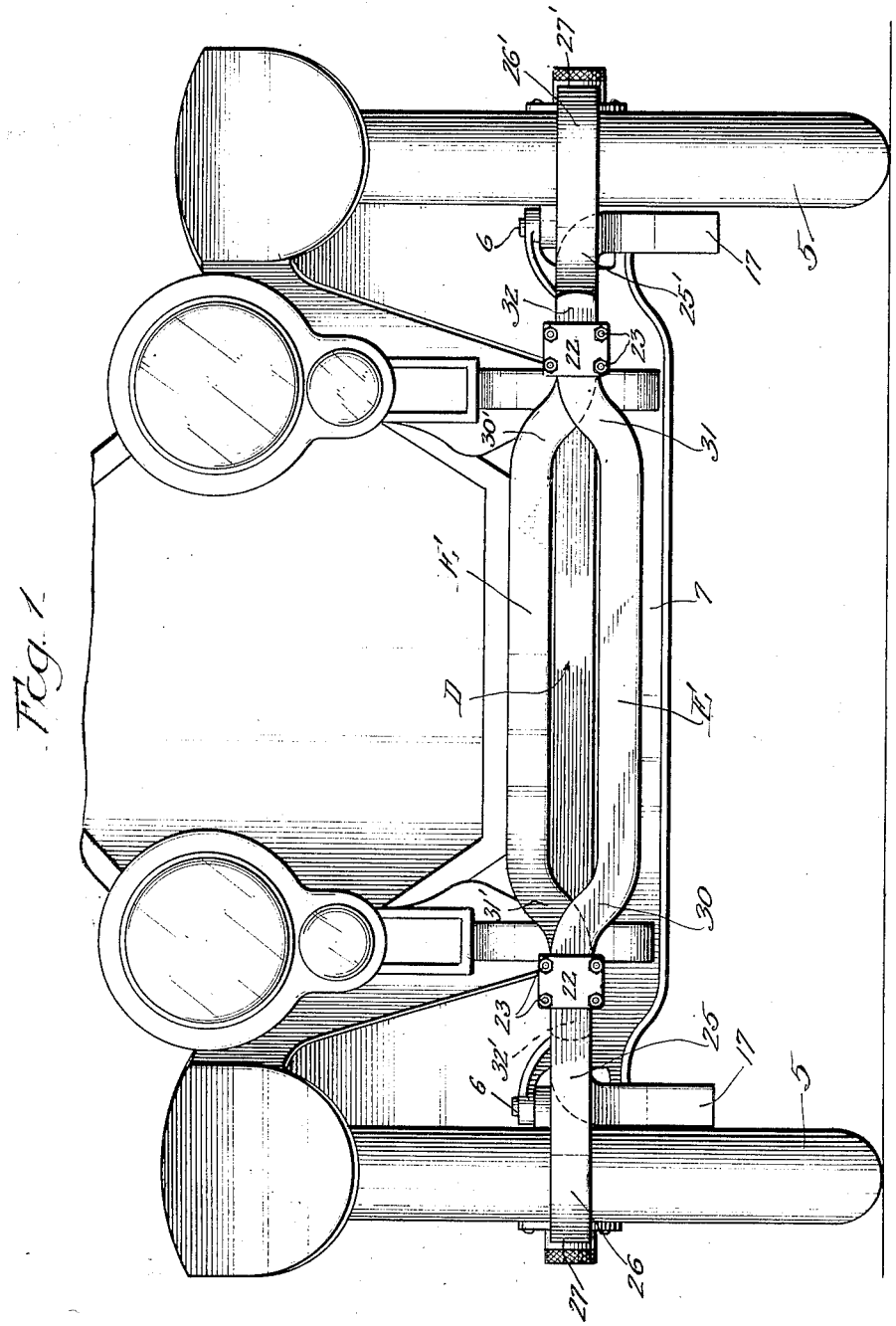

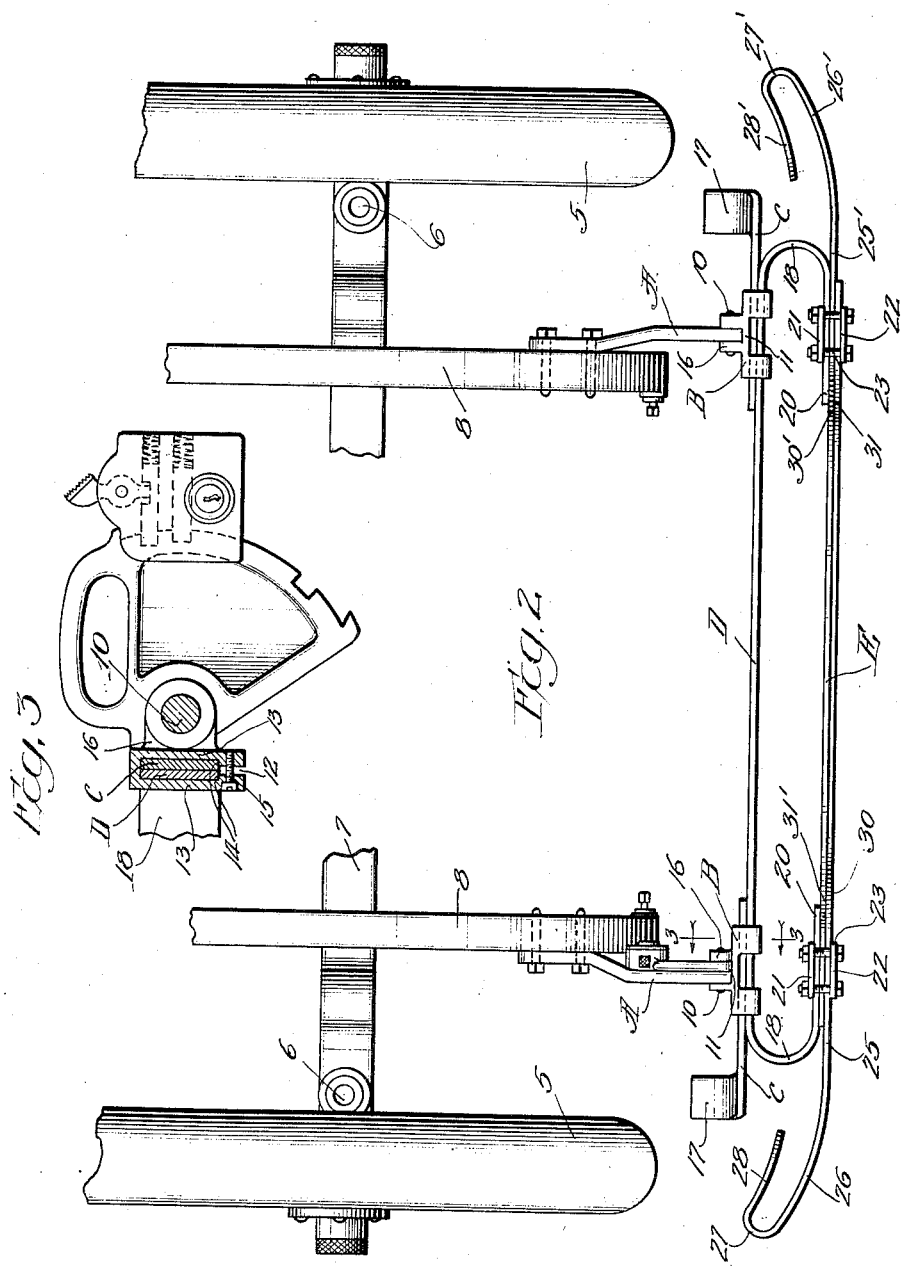

FRANK R. PROCUNIER, OF CHICAGO, ILLINOIS, ASSIGNOR OF ONE-HALF TO LOUIS N. TURNER AND ONE-FOURTH TO JESSE C. STRYKER, BOTH OF CHICAGO, ILLINOIS.

AUTOMOBILE-BUMPER.

1,397,741.   Specification of Letters Patent.   Patented Nov. 22, 1921.

Application filed January 14, 1921. Serial No. 437,331.

*To all whom it may concern:*

Be it known that I, FRANK R. PROCUNIER, a citizen of the United States, residing at Chicago, in the county of Cook and State of Illinois, have invented certain new and useful Improvements in Automobile-Bumpers, of which the following is a specification.

This invention relates to a combined bumper and lock adapted to be mounted upon the front of an automobile and follows in general the constructions shown in my Patents Nos. 1,245,124 and 1,353,220. Certain improved features, however, are herein shown and described, and more particularly set forth in the appended claims, and are furthermore illustrated in the accompanying drawings in the manner following:

Figure 1 is a front elevation of an automobile equipped with a bumper embodying the present improvements;

Fig. 2 is a plan view of the front part of an automobile showing the bumper applied thereto; and Fig. 3 which is a cross section taken on line 3—3 of Fig. 2, represents a detail of certain parts on an enlarged scale.

The parts of an automobile that are represented in the drawing include the two front wheels 5 each arranged to steer by swiveling around a pin 6 suitably mounted on the front axle 7 that is supported between two longitudinal frame members 8. For purposes of strength, these frame members are usually of channel formation, the forward end of each being slightly tapered and downwardly curved in accordance with general practice.

Extending from the forward end of each frame member is a bracket A to the front end of which is pivotally secured as at 10 a clamping frame B, all in the manner shown. Each frame consists of a web 11 connecting at its opposite ends a pair of clamping boxes split as at 12 to provide spring sections 13 each having a shoulder 14 turned toward the other, a bolt 15 extending between the two sections to draw them together as necessary. Extending rearwardly of the web are spaced ears 16 through which the pivotal connection is made with the bracket.

Clamping adjustably within each frame is an outwardly extending locking arm C provided with a downward and slightly rearward extension 17 which lies forward and inside of the proximate wheel 5 so as normally to afford adequate clearance for its steering movements. Each arm may be rested upon one of the shoulders 14 within the frame and upon the opposite shoulder is supported the rear bar D of a duplex bumper with which is combined a front or contact bar E. These bars may each consist of flat spring steel, the rear bar extending through both frames B with its ends bent forwardly as at 18 through an arc of 180° to provide short front extensions 20. Adjacent each such extension is a clamping device which may consist of a plate 21 through which, as well as through a second plate 22, extends clamping bolts 23 to secure the front bar E to its companion bar D. Preferably the front bar comprises two parts, one designated as 25 extending from one of the clamping devices to the other, as well as therebeyond, its end so extended being curved slightly rearwardly as at 26, then around through an arc of about 180° as at 27 and back for a short distance to provide a return piece 28. This bar is furthermore preferably offset in the direction of its long dimension, either upwardly or downwardly as at 30, and again as at 31, so that its end 32 may aline with the proximate clamping device. The other component part of the front bar E is formed in a manner exactly complementary to the one just described, and similar reference numerals, modified only by the addition of a "'" are accordingly applied to the corresponding places. The one part 25 is placed rearwardly of the other part 25'; their bent ends are disposed oppositely, and likewise their offsets are oppositely arranged so as to present a widened front to the bumper. Between the clamping devices wherein they are supported, these two parts of the bar E may be adjusted lengthwise as desired.

The bumper herein described is adapted for use in the position shown, but may be swung downwardly around the pivotal connection 10 as a center so as to present the extensions 17 of the locking arms between the two wheels 5, thus interfering with their steering movements. The means by which the swinging movements of the bumper are controlled forms no part of this invention, but may, if desired, follow the teachings of my patents aforesaid.

It will be observed that the present bumper, which may or may not, as desired, be combined with a locking device for the wheels, is duplex in character, and that its component parts are so associated together as to provide for relative adjustments according to the desires of the user. The absorption of shocks, due to bumps, etc., is not only taken care of in the spring material composing the front or contact bar, but is further augmented by the bend extending a half turn which the rear bar makes close to the points of its attachment thereto. Should any of the component parts of the device become damaged or unfit for use, a substitution thereof may be easily effected; a disassembly may likewise be accomplished with facility in case it is desired to repair any particular part. The precise form and construction may, of course, vary in numerous particulars without departing from the spirit of the invention, the scope of which is to be determined by reference to the claims defining same, as follows:

I claim:

1. In combination with a pair of supporting brackets, a clamping frame carried by each bracket, and a duplex bumper mounted in the frame, the bumper comprising forward and rearward bars in connected relation, each adjustable longitudinally of the other, substantially as described.

2. In combination with a pair of supporting brackets, a clamping frame carried by each bracket, and a duplex bumper mounted in the frame, the bumper comprising forward and rearward bars in connected relation, each adjustable with respect to the other, as well as with respect to the brackets, substantially as described.

3. In combination with a pair of supporting brackets, a bumper, and a device connecting the bumper to each bracket, comprising a split frame secured to the latter and providing a box within which the bumper may be adjustably held, there being means for drawing together the split portions of the frame to thereby clamp the bumper therewithin, substantially as described.

4. In combination with a pair of supporting brackets, a bumper secured thereto, and comprising forward and rearward bars, the later adjustably connected to the brackets and having its ends bent around through 180° to provide forward extensions to which the front bumper bar is adjustably connected, substantially as described.

5. In combination with a pair of supporting brackets, a bumper secured thereto, and comprising a rearward bar connected to each bracket, the ends of the bar being bent around through 180° to provide forward extensions, and a forward bar formed of two pieces in overlapping relation, each adjustably connected to the other and to the forward extensions of the rearward bar, substantially as described.

6. In combination with a pair of supporting brackets, a bumper secured thereto comprising forward and rearward bars, the former of two pieces in overlapping relation, each adjustably connected to the other and to the rearward bar, substantially as described.

7. In combination with a pair of supporting brackets, a bumper secured thereto, and comprising forward and rearward bars, the latter adjustable with respect to the brackets, the forward bar being formed of two pieces in overlapping relation and connected with the rearward bar in spaced relation thereto, substantially as described.

8. In combination with a pair of supporting brackets, a bumper, means swingingly connecting the bumper to each bracket, and a locking arm carried by the connecting means, substantially as described.

9. In combination with a pair of supporting brackets, a bumper, a frame swingingly mounted on each bracket and provided with clamping means for engaging with the bumper, and a locking arm also engaged by the clamping means, substantially as described.

10. In combination with supporting brackets, a duplex bumper comprising forward and rearward bars, the latter connected with the brackets and having ends bent around to provide forward extensions which connect with the forward bar, substantially as described.

11. In combination with supporting brackets, a duplex bumper comprising forward and rearward bars, the latter connected with the brackets, and being so formed as to present a portion of itself forwardly of its point of connection therewith, the forward bar being mounted upon a forwardly extended portion of the rearward bar, substantially as described.

FRANK R. PROCUNIER.

Witness:
EPHRAIM BANNING.